United States Patent [19]

Metcalf

[11] Patent Number: 4,929,861
[45] Date of Patent: May 29, 1990

[54] QUICK RELEASE LATCHING AND DISPENSING DEVICE

[76] Inventor: Darrell J. Metcalf, 520 First St., Fillmore, Calif. 93015

[21] Appl. No.: 286,150

[22] Filed: Dec. 19, 1988

[51] Int. Cl.$^5$ .......................................... B65D 85/672
[52] U.S. Cl. ........................................ 312/18; 292/88; 292/205; 206/387; 312/216; 312/319
[58] Field of Search ............... 292/87, 88, 80, 205; 206/387; 312/216, 16, 15, 18, 319

[56] References Cited

U.S. PATENT DOCUMENTS

| | | | |
|---|---|---|---|
| 1,033,014 | 7/1912 | Holstein | 312/15 |
| 3,969,007 | 7/1976 | Lowry | 206/387 X |
| 3,994,550 | 11/1976 | Ackeret | 312/15 X |
| 4,084,865 | 4/1978 | Joyce | 206/387 X |
| 4,087,138 | 5/1978 | McRae | 206/387 |
| 4,270,817 | 6/1981 | McRae | 206/387 X |
| 4,330,162 | 5/1982 | Aboussouan | 206/387 X |
| 4,577,914 | 3/1986 | Stravitz | 206/387 X |
| 4,678,245 | 7/1987 | Fouassier | 206/387 |

*Primary Examiner*—Joseph Falk
*Attorney, Agent, or Firm*—Robert M. Sperry

[57] ABSTRACT

Improved means for storing and retrieving articles including latching means for releasably retaining said articles, said latching means comprising a base member, a resilient lever portion projecting forwardly from said base member and formed with a latching projection extending upwardly adjacent the forward end of said lever portion to releasably retain an article on said latching means when said lever portion is in its normal raised position, and resilient means located adjacent the rear end of said base member and operable to eject an article from said base member when said lever portion is depressed, together with lock means movable into and out of a position to prevent depression of said lever to prevent unauthorized removal of articles from said latching means.

28 Claims, 6 Drawing Sheets

QUICK RELEASE LATCHING AND DISPENSING DEVICE

BACKGROUND

1. Field of Invention

This invention relates to latching and dispensing mechanisms and is particularly directed to releasable latching mechanisms for facilitating the opening and storage of drawers or the storage and retrieval of articles such as audio and video tape boxes, compact discs and the like.

2. Prior Art

In recent years, audio and video cassette recorders, personal computers and the like have created revolutionary changes in personal and business life. Most of these changes have been beneficial. However, there have also been some negative changes. One of these is the number of audio and video tapes, compact discs and the like which seem to multiply like rabbits. In no time, one finds themself with several piles of these devices with no satisfactory means for storage and cataloging. Although labels are provided which serve to identify the contents of a particular cassette or compact disc, it is frequently necessary to sort through several boxes before the desired one is located. Furthermore, it is preferable to store discs, cassettes and the like in containers which will protect them from dust or rough handling. Of course, other articles requiring frequent use or lockable security may conveniently be stored and dispensed from such a device including medicine containers, hardware, odds and ends, spice boxes and the like.

Numerous devices have been proposed heretofore for accomplishing this purpose. However, none of the prior art devices have been entirely satisfactory. Thus, it has been proposed to provide box-type containers which protect the contents from dust, and the like, but which still require the user to physically pull out drawers or sort through the contents to find a desired disc or cassette. Another prior art approach has been to stagger the height of each of the stored contents within the container or to color-code the compartments within the container to facilitate visual reference to the contents stored therein. Another prior art storage method is to provide numbered labels which can be attached to each article and which correspond to numbered chambers or slots in the container. Usually, the container will have a sheet attached thereto which contains an index of the contents in each of the numbered chambers or slots. These devices usually require manual insertion or removal of the discs, cassettes or other articles and, because the contents are packed very close together to minimize space requirements, it is often difficult to get an adequate grip on the desired article to permit removal. Furthermore, where security is of concern, the prior art generally relies upon hinged lids or covers with various types of locking mechanisms. However, operation of the hinged lids or covers often doubles the space needed for the closed container. Thus, none of the prior art storage containers have been entirely satisfactory.

BRIEF SUMMARY AND OBJECTS OF INVENTION

These disadvantages of the prior art are overcome with the present invention and improved latching and dispensing means are provided which may be utilized with a container or standing alone and which greatly facilitate the opening and storage of drawers or the storage and retrieval of articles, such as audio and video cassettes, compact discs and the like, and which provide means for securing the contents of the latching means without significantly increasing the space required.

The advantages of the present invention are preferably attained by providing improved latching means comprising a base member, a resilient lever portion projecting forwardly from said base member and formed with a latching projection extending outwardly adjacent the forward end of said lever portion to releasably retain an article on said latching means when said lever portion is in its normal non-depressed position, and resilient means located adjacent the rear end of said base member and operable to eject an article from said base member when said lever portion is depressed. Lock means may be provided which are movable into and out of a position to prevent depression of said lever to prevent unauthorized removal of articles from said latching means.

Accordingly, it is an object of the present invention to provide improved latching means for storing and dispensing a variety of articles, such as audio and video cassettes, compact discs and the like.

Another object of the present invention is to provide improved latching means for storing and dispensing articles which means may be free-standing or may be included in a container for such articles.

An additional object of the present invention is to provide improved latching means for storing and dispensing articles, together with locking means therefor which does not significantly increase the space required therefor.

A further object of the present invention is to provide an improved latching and dispensing container with means for storing and opening drawers within said container.

Another object of the present invention is to provide an improved latching and dispensing container having means for securely mounting said container on a wall or the like.

A specific object of the present invention is to provide improved latching means for storing and dispensing drawers and articles, said latching means comprising a base member, a resilient lever portion projecting forwardly from said base member and formed with a latching projection extending outwardly adjacent the forward end of said lever portion to releasably retain an article or drawer on said latching means when said lever portion is in its normal non-depressed position, and resilient means located adjacent the rear end of said base member and operable to eject an article from said base member when said lever portion is depressed.

Another specific object of the present invention is to provide improved latching means for storing and dispensing drawers and articles, said latching means comprising a base member, a resilient lever portion projecting forwardly from said base member and formed with a latching projection extending outwardly adjacent the forward end of said lever portion to releasably retain an article on said latching means when said lever portion is in its normal non-depressed position, and resilient means located adjacent the rear end of said base member and operable to eject an article from said base member when said lever portion is depressed, together with lock means movable into and out of a position to prevent depression of said lever to prevent unauthorized removal of articles or drawers from said latching means.

A further specific object of the present invention is to provide improved latching means for storing and dispensing drawers and articles, said latching means comprising a base member, a resilient lever portion projecting forwardly from said base member and formed with a latching projection extending outwardly adjacent the forward end of said lever portion to releasably retain an article on said latching means when said lever portion is in its normal non-depressed position, and resilient means located adjacent the rear end of said base member and operable to eject an article from said base member when said lever portion is depressed, together with friction reducing means mounted on the article engaging portions of said resilient means.

These and other objects and features of the present invention will be apparent from the following detailed description, taken with reference to the figures of the accompanying drawings.

BRIEF DESCRIPTION OF THE DRAWINGS

FIG. 7 is a view, similar to that of FIG. 3, showing means for securely mounting the latching means of FIG. 3 to a wall or the like.

DETAILED DESCRIPTION OF THE INVENTION

Figure 1:
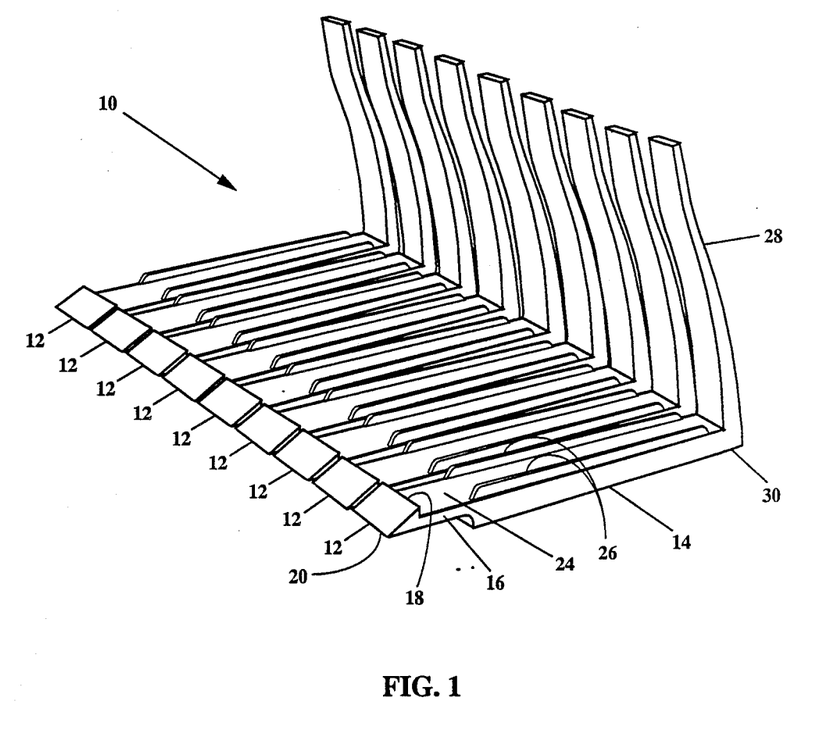
FIG. 1 is an isometric view of a latching mechanism embodying the present invention.
Figure 2:
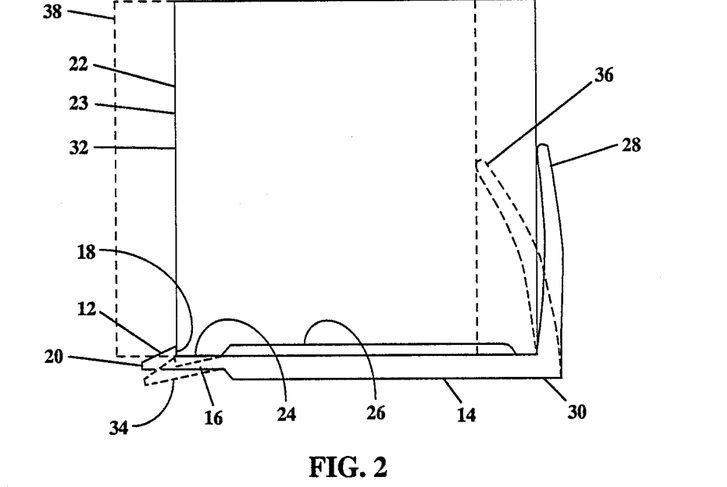
FIG. 2 is a side view of the latching mechanism of FIG. 1, shown with an article or drawer releasably retained by the latching mechanism.

In that form of the present invention chosen for purposes of illustration in FIG. 1, a latching device, indicated generally at 10, is shown having a plurality of latching mechanisms 12 each comprising a base member 14 having a resilient lever portion 16 projecting forwardly from said base member 14 and formed with a latching projection 18 extending upwardly adjacent the forward end 20 of the lever portion 16 to releasably retain an article or drawer, as best seen at 22 and 23 in FIG. 2. Preferably, the upper surface 24 of the base member 14 will be formed wide enough to support the article 22. Moreover, if desired, flanges 26 may be provided adjacent the opposite edges of the upper surface 24 to prevent lateral displacement of article 22 or drawer 23. Finally, resilient means 28 located adjacent the rear end 30 to assist in retaining the article 22 or drawer 23 by urging the article 22 or drawer 23 into engagement with the latching projection 18 and serving to eject the article 22 or drawer 23 outward from the base member 14 when the lever portion 16 is depressed.

As seen in FIG. 1, a plurality of latching mechanisms 12 are shown and it will be apparent that the adjacent base members 12 may be independent and free-standing or, if desired, could be joined along their common edges or could be formed integral with adjoining base members 12.

In use, an article 22 or drawer 23 is placed on the upper surface 24 of the base member 14 and is urged rearwardly against the action of resilient means 28 until the latching projection 18 of the lever portion 16 engages the front edge 32 of the article 22 or drawer 23, as seen in solid lines in FIG. 2. The article 22 or drawer 23 will then be retained on the base member 14 for storage. To release the article 22 or drawer 23, the lever portion 16 is depressed to the dotted line position, indicated at 34 in FIG. 2. This allows the resilient means 28 to return to its normal position, indicated in dotted lines at 36 in FIG. 2, and forces the article 22 or drawer 23 forward, as indicated in dotted lines at 38 in FIG. 2. The article 22 or the contents of drawer 23 then can easily be removed for use as desired.

Figure 3:
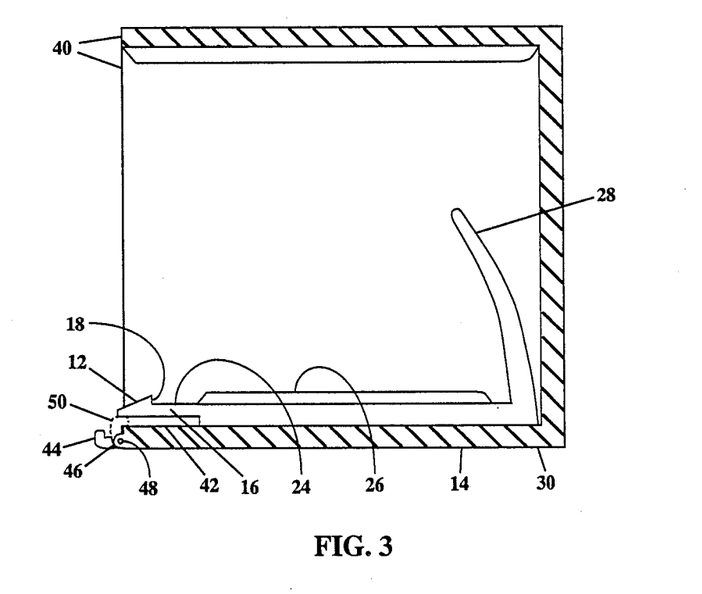
FIG. 3 is a side view, partly in section, showing a container including a modified form of the latching mechanism of FIG. 1.

FIG. 3 shows a modified form of the latching device 10 of FIG. 1. In this form, one or more of the latching mechanisms 12 are mounted within a suitable container 40 which serves to protect the articles placed therein from dust and the like. Also, in this form of the invention, the base member 14 or container 40 is provided with a projection 42 extending forwardly and spaced from the lever portion 16. A lock member 44 is pivotally secured to the front edge 46 of the projection 42, as by hinge 48, and is movable between an unlocked position, as seen in solid lines in FIG. 3, and a locking position, seen in dotted lines at 50 in FIG. 3, wherein the lock member 44 is interposed between the lever portion 16 and the projection 42. In the locking position 50, the lock member 44 blocks downward movement of the lever portion 16 and, thus, prevents release of articles retained within the container 40.

Figure 4:
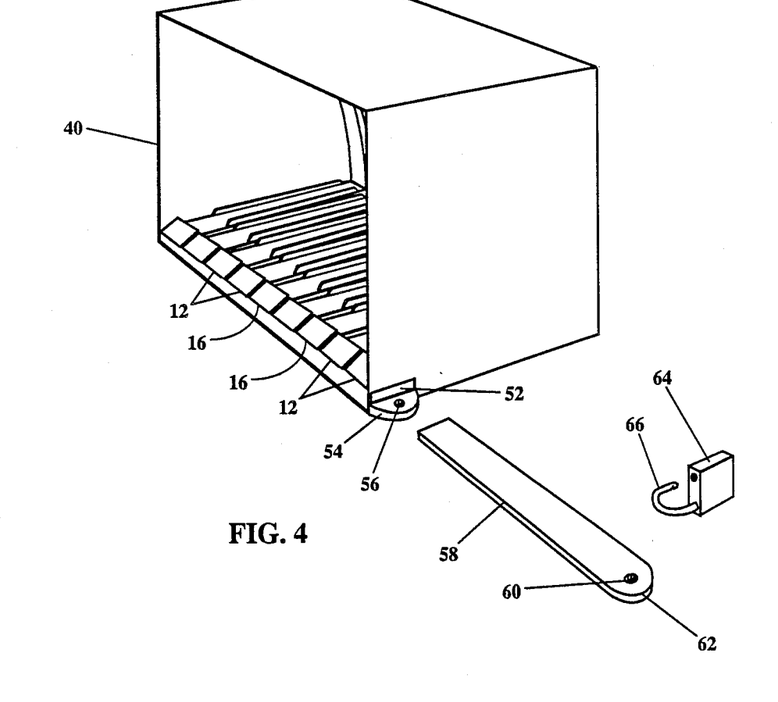
FIG. 4 is an isometric view showing an alternative form of locking means for the latching mechanism of FIG. 3.

FIG. 4 shows a modified form of the latching device of FIG. 3. In this form, the latching mechanisms 12 are similar to those of FIGS. 1 and 2, but may be mounted within or formed integral with a container 40, as in the device of FIG. 3. However, in this form of the invention, an opening 52 is formed in the front lower corners of the container 40 and a flange 54 having an aperture 56 formed therein is mounted adjacent the opening 52 on at least one side of the container 40. A slide bar 58 is provided having an aperture 60 formed adjacent one end 62 thereof and is slidable into and out of the opening 52 below the lever portions 16 of the latching mechanisms 12 to prevent the lever portions 16 of the latching mechanisms 12 from being depressed. A conventional lock 64 having a hasp 66 may be employed to secure the slide bar 58 in the container 40 by passing the hasp 66 through the apertures 56 and 60.

Figure 5:
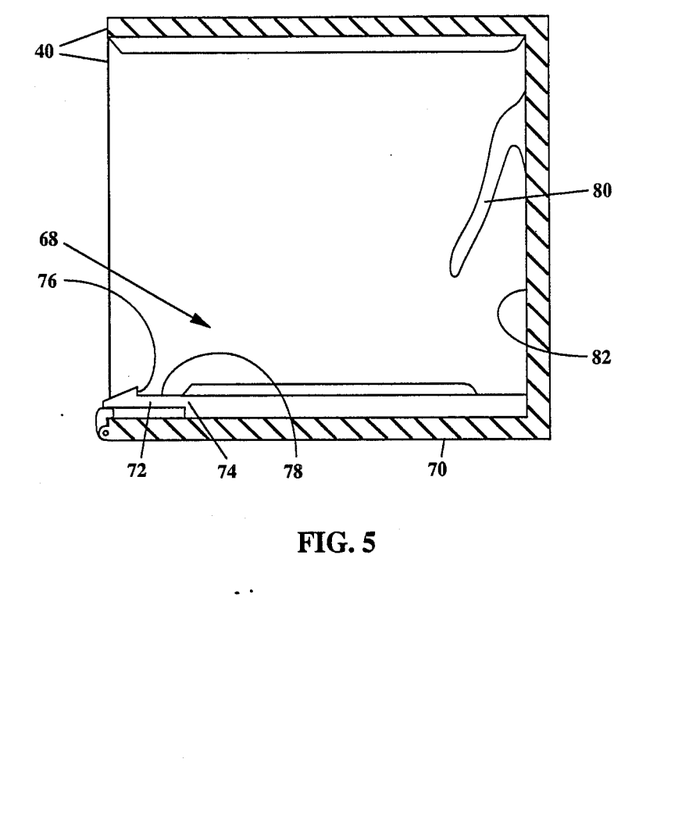
FIG. 5 is a view, similar to that of FIG. 3 showing a further alternative form of the latching mechanism of FIG. 1.

FIG. 5 shows a further alternative form of the latching mechanism of the present invention. In this form of the invention, a container 40 includes one or more latching mechanisms, indicated generally at 68, each comprising a base member 70 having a lever portion 72 projecting from the forward end 74 of the base member 70 and having a latching projection 76 projecting upwardly from the lever portion 72 to releasably retain articles placed on the upper surface 78 of the base member 70. One or more resilient means 80 are mounted on or formed integral with the inner rear wall 82 of the container 40 by suitable means, such as glue, nails, screws or the like, and is positioned to urge articles inserted into the container 40 forwardly for releasable engagement by the latching projections 76 of the lever portions 72 of the base members 70. As seen in FIG. 5, the resilient means 80 is mounted adjacent the upper edge of the rear wall 82 of container 40 and projects downwardly and outwardly therefrom. However, it will be apparent that the resilient means 80 could, if desired, be mounted adjacent the lower edge of the rear wall 82 of container 40 and could extend upwardly and outwardly therefrom. It will also be apparent that the base member 70 may, if desired, be formed integral with the container 40. Moreover, if desired, the resilient means 80 may be formed integral with the rear wall 82 of the container 40 or, alternatively, a plurality of the resilient means 80 may be formed as an integral unit which could be mounted on the rear wall 82 of the container 40 in position such that each of the resilient means 80 could cooperate with a corresponding one of the base members 70.

Figure 6:
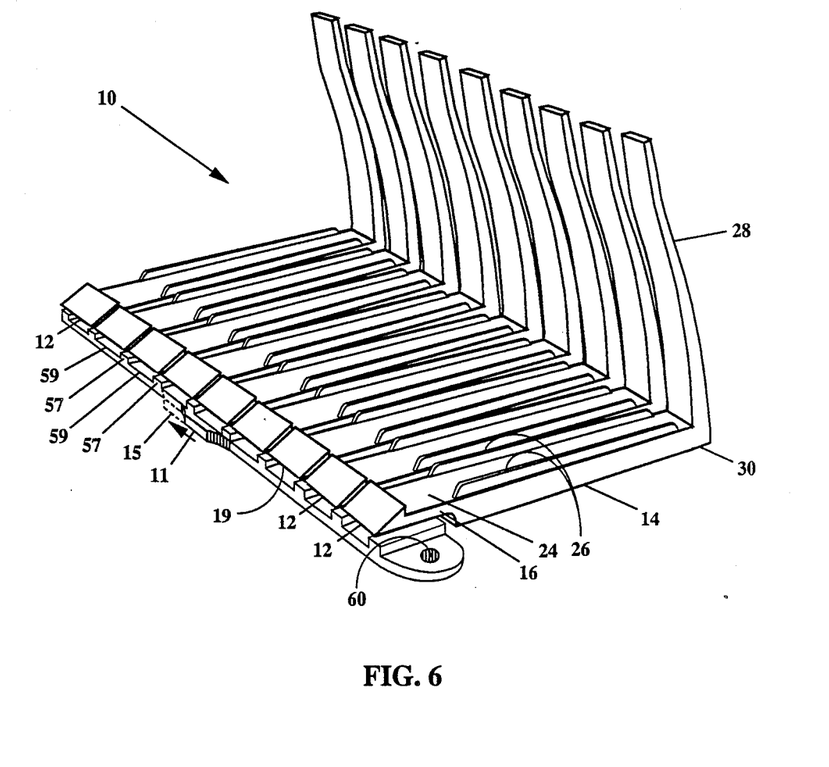
FIG. 6 is a view, similar to that of FIG. 1, showing a further alternative locking means for the latching means of FIG. 3.

FIG. 6 shows an alternative form of locking means for the latching mechanism of FIG. 3. In this form, a slide bar 58 is formed with a plurality of alternate ridges 57 and recesses 59 and is provided with a lever 11 which facilitates movement of the slide bar 58 between a locking position, wherein the ridges 57 underlie the adjacent lever portions 16 of the latching mechanisms 12 and an unlocked position, as indicated in dotted lines at 15, wherein the recesses 59 are beneath the lever portions 16. Obviously, when the ridges 57 are positioned beneath the lever portions 16, the lever portions 16 cannot be depressed and, hence, the articles retained on the base members 14 cannot be removed. Alternatively, when the recesses 59 ar located below the lever portions 16, the lever portions 16 can be depressed to permit removal of the articles from the base members 14.

Figure 7:
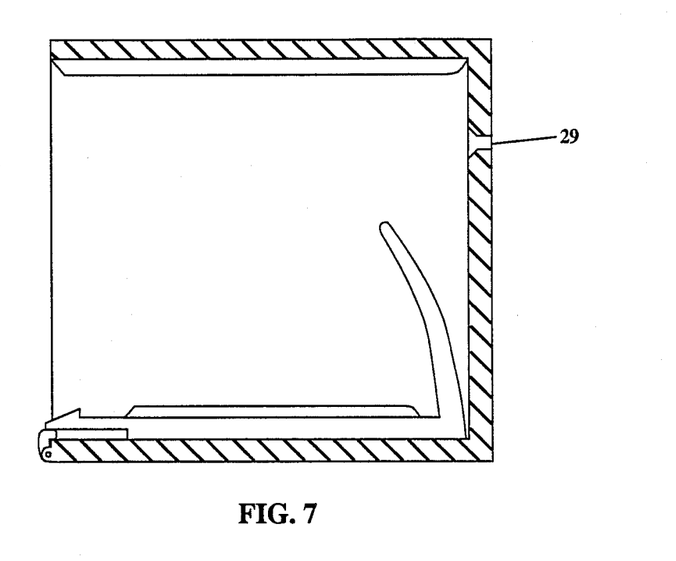

FIG. 7 is a view, similar to that of FIG. 5, showing a modified form of the container 40 wherein one or more openings 29 extend through the rear wall 82 of the container 40. This permits screws or the like to be passed through the openings 29 to mount the container 40 on a wall or the like, not shown. When so mounted, the presence of articles in the container 40 will prevent access to the openings 29 and, hence, will prevent unauthorized removal of the container 40 and will provide additional security for the articles contained within the container 40.

Figure 8:
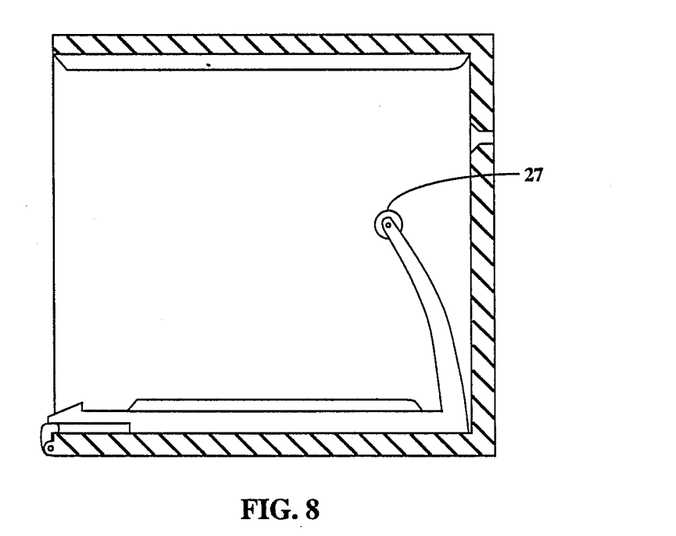
FIG. 8 is a view, similar to that of FIG. 3, showing means for reducing friction between the resilient means and articles engaged thereby.

FIG. 8 is a view, similar to that of FIG. 3, having rollers 27 or the like, mounted on the article engaging portions of the resilient means 28 to reduce friction between the resilient means 28 and the articles engaged thereby.

Obviously, numerous other variations and modifications could also be made without departing from the spirit of the present invention. Therefore, it should be clearly understood that the forms of the present invention described above and shown in the figures of the accompanying drawings are illustrative only and are not intended to limit the scope of the present invention.

What is claimed is:

1. Storage means for storing and retrieving articles, said storage means including at least one latching means for releasably retaining said articles, (The latching means of claim 2 wherein:)
   a base member,
   a resilient lever portion projecting forwardly from said base member and formed with a latching projection extending upwardly adjacent the forward end of said lever portion to releasably retain an article on said latching means when said lever portion is in its normal raised position,
   resilient means located adjacent the rear end of said base member and operable to eject an article from said base member when said lever portion is depressed, and
   lock means movable into and out of a position to prevent depression of said lever to prevent unauthorized removal of articles from said latching means,
   said base member (is) being formed with a projection extending forwardly below said lever portion, and
   said lock means (is) being pivotally mounted on said projection and (is) movable into and out of a position to block depression of said lever portion.

2. The storage means of claim 1 further comprising:
   Container means containing at least one of said latching means and serving to protect articles therein against dust.

3. The latching means of claim 2 wherein:
   said resilient means is independent of said base member and is mounted on the inner rear wall of said container.

4. The latching means of claim 3 wherein:
   a plurality of said latching means are provided, and
   said resilient means are formed as an integral unit mountable on the inner rear wall of said container and positioned to cooperate with respective ones of said base members.

5. The latching means of claim 1 wherein:
   said resilient means is integral with said base member and projects upwardly adjacent the rear end of said base member.

6. The latching means of claim 1 wherein:
   said latching means is an integral, stand-alone unit.

7. The latching means of claim 1 wherein:
   a plurality of said latching means are provided having the adjacent edges of the base members joined together.

8. The storage means of claim 1 further comprising:
   at least one opening extending through (the rear wall of) said container to permit secure mounting of said container on a (wall or the like) desired mounting surface, and
   securing means securing said container means to (a) said desired mounting surface in a manner such that access cannot be had to said securing means when articles are located within said storage means and said lock means is locked.

9. The latching means of claim 1 further comprising:
   friction reducing means mounted adjacent the article engaging surfaces of said resilient means.

10. The latching means of claim 1 wherein:
    said friction reducing means are rollers.

11. Storage means for storing and retrieving articles, said storage means including at least one latching means for releasably retaining said articles, said latching means (The latching means of claim 3 further) comprising:
    a base member,
    a resilient lever portion projecting forwardly from said base member and formed with a latching projection extending upwardly adjacent the forward end of said lever portion to releasably retain an article on said latching means when said lever portion is in its normal raised position,
    container means containing at least one of said latching means and serving to protect articles therein against dust, an opening formed adjacent the front lower corner of at least one side of said container, a flange projecting outwardly from the side of said container adjacent said opening and having an aaperture formed in said flange, and a slide bar movable into and out of said opening adjacent the lever portions of said latching means and formed with an aperture adjacent one end of said slide bar.

12. The latching means of claim 11 wherein:

said resilient means is integral with said base member and projects upwardly adjacent the rear end of said base member.

13. The latching means of claim 11 wherein:

said resilient means is independent of said base member and is mounted on the inner rear wall of said container.

14. The latching means of claim 11 wherein:

said latching means is an integral, stand-alone unit.

15. The latching means of claim 11 wherein:

a plurality of said latching means are provided having the adjacent edges of the base members joined together.

16. The latching means of claim 11 wherein:

a plurality of said latching means are provided, and said resilient means are formed as an integral unit mountable on the inner rear wall of said container and positioned to cooperate with respective ones of said base members.

17. The latching means of claim 11 further comprising:

at least one opening extending through said container to permit secure mounting of said container on a desired surface.

18. The latching means of claim 11 further comprising:

friction reducing means mounted adjacent the article engaging surfaces of said resilient means.

19. The latching means of claim 18 wherein:

said friction reducing means are rollers.

20. Storage means for storing and retrieving articles, said storage means including at least one latching means for releasably retaining said articles, said latching means (The latching means of claim 3 wherein) comprising:

a base member, a resilient lever portion projecting forwardly from said base member and formed with a latching projection extending upwardly adjacent the forward end of said lever portion to releasably retain an article on said latching means when said lever portion is in its normal raised position, lock means movable into and out of a position to prevent movement of said lever to prevent unauthorized removal of articles from said latching means, container means containing at least one of said latching means and serving to protect articles therein against dust, said lock means is a slide bar formed with a plurality of alternate ridges and recesses movable into and out of positions adjacent the lever portion of said latching means to selectably prevent movement of said lever portion.

21. The latching means of claim 20 wherein:

said resilient means is integral with said base member and projects upwardly adjacent the rear end of said base member.

22. The latching means of claim 20 wherein:

said resilient means is independent of said base member and is mounted on the inner rear wall of said container.

23. The latching means of claim 20 wherein:

said latching means is an integral, stand-alone unit.

24. The latching means of claim 20 wherein:

a plurality of said latching means are provided having the adjacent edges of the base members joined together.

25. The latching means of claim 20 wherein:

a plurality of said latching means are provided, and said resilient means are formed as an integral unit mountable on the inner rear wall of said container and positioned to cooperate with respective ones of said base members.

26. The latching means of claim 20 further comprising:

at least one opening extending through said container to permit secure mounting of said container on a desired surface.

27. The latching means of claim 20 further comprising:

friction reducing means mounted adjacent the article engaging surface of said resilient means.

28. The latching means of claim 27 wherein:

said friction reducing means are rollers.

* * * * *